(12) United States Patent
Onken

(10) Patent No.: US 6,981,498 B2
(45) Date of Patent: Jan. 3, 2006

(54) WASTE GREASE COLLECTION TANK AND METHOD FOR ITS USE

(76) Inventor: Donald Onken, P.O. Box 72, Easton, IL (US) 62633

( * ) Notice: Subject to any disclaimer, the term of this patent is extended or adjusted under 35 U.S.C. 154(b) by 0 days.

(21) Appl. No.: 10/725,425

(22) Filed: Dec. 3, 2003

(65) Prior Publication Data

US 2005/0121022 A1    Jun. 9, 2005

(51) Int. Cl.
*B65F 1/14*    (2006.01)
(52) U.S. Cl. ............... 126/343.5 A; 126/390.1; 220/233; 220/560.3; 220/DIG. 6; 220/DIG. 27
(58) Field of Classification Search ......... 126/343.5 A, 126/343.5 R, 390.1, 383.1, 373.1; 220/560.03, 220/DIG. 27, DIG. 6, 233
See application file for complete search history.

(56) References Cited

U.S. PATENT DOCUMENTS

| | | | |
|---|---|---|---|
| 368,412 A | * | 8/1887 | Miller et al. ................. 37/228 |
| 1,689,917 A | * | 10/1928 | Geisinger ................... 165/118 |
| 3,499,678 A | * | 3/1970 | Richler ........................ 296/208 |
| 4,450,828 A | * | 5/1984 | Onken et al. ......... 126/343.5 A |
| 5,718,220 A | * | 2/1998 | Onken ................. 126/343.5 A |

* cited by examiner

*Primary Examiner*—Monica S. Carter
*Assistant Examiner*—James G. Barow
(74) *Attorney, Agent, or Firm*—Ronald E. Greigg

(57) ABSTRACT

A double walled waste grease collecting tank for use in collection system in which the collecting tank is partially submersed in a hot water bath to soften or melt grease at the container walls to facilitate emptying the solid or semi-solid collected grease. The double walled collecting tank has fill openings in its outer wall adjacent its bottom which are normally closed by removable plugs. The plugs are removed to enable hot water to enter the space between the double walls when the tank is submerged into the hot water bath, then replaced when the tank is emptied. Closable vent openings provided adjacent the top of the outer wall are opened to permit rapid filling and emptying the air space between the double walls, and closed when the tank is emptied.

11 Claims, 3 Drawing Sheets

(PRIOR ART)

WASTE GREASE COLLECTION TANK AND METHOD FOR ITS USE

BACKGROUND OF THE INVENTION

1. Field of the Invention

This invention relates to an improved collection tank for the in situ collection of waste grease such as cooking oils or grease, and to a method of collecting the grease by elevating the tank and lowering it into a hot water bath to warm the walls and facilitate dumping of the grease.

2. Description of the Prior Art

It is well known to collect used or waste greases in collection or holding tanks at the point of use such as at a fast food restaurant or the like, then to collect the waste grease from such tanks for processing and/or recycling. U.S. Pat. No. 4,450,828 and U.S. Pat. No. 5,718,220 disclose waste grease tanks used for collecting grease products, and a process for collecting the grease by a transport truck including a heating bath for heating the tank so that the grease can be easily dumped.

With reference to FIG. 4, which is a copy of FIG. 1 found in U.S. Pat. No. 4,450,828, the numeral 11 generally designates a truck, which has conventional wheels 13 and a cab 15 associated with a conventional engine (not shown). The cargo part 17 is a large tank for holding the dumped grease. In the bottom of the tank 17 there is a tube by which steam can be fed through in-out openings 20 to melt the collected grease from drainage (at a warehouse) through a valved outlet coupler 21.

The mechanism for lifting, immersing, and dumping the containers comprises a pair of lever arms 24 simultaneously swung by hydraulic cylinders 26. The upper ends of the arms 24 are bridged by a bar and by a shaft having winch spools 29 thereon for winding and unwinding cables or chains 31 thereon. The winch 29 is opened by a reversible hydraulic motor 33 of know construction.

The on-site left-there container 35 is of a size of equal several of the barrels previously employed. It has downwardly inwardly tapered sides to facilitate dumping the semi-sold grease block after its sides are heat-softened by immersion of the container in a hot-water-bath vat located, for example, at the rear of the truck (heated in known manner by an immersion electric heater or by hot-water or exhaust-gas coils, not shown). The container 35 has lift lugs 39 and dumping-tilting lugs 40.

The grease-dumping operation is best illustrated in FIG. 4. Firstly the container is sitting at ground level (left phantom). Secondly, it is winch-lifted to the full-line-shown position. Thirdly, it is lowered into the hot-water bath at the rear of the truck. Fourthly, it is again lifted and is swung to the last (right) position shown in FIG. 4. Fifthly, it is dumped by lowering the container 35, so that the lugs 40 enter J-shaped pockets 53, which are welded to the inner faces of the lift levers 24. After this, further lowering of the container 35 makes it pivot around said lugs 40 to dump its grease contents.

Under certain conditions, environmental protection considerations now require waste grease collection tanks to have double walls to guard against spillage or leakage in the event of an accidental rupturing or puncturing of the tank wall. However, such double-walled construction provides an insulating air space between the inner and outer container walls which makes submergence into a hot water bath particularly ineffective in warming the inner container wall to facilitate dumping of the solid or semi-solid waste grease.

It is therefore an object of the present invention to provide an improved double-walled collection tank which facilitates emptying of waste grease from the tank.

It is another object to provide a double-walled collection tank which may be quickly and effectively heated by dipping into a hot water bath to facilitate emptying of the solid or semi-solid grease stored therein.

Another object is to provide an improved method of emptying solid or semi-solid waste grease from a double-walled collection tank.

SUMMARY OF THE INVENTION

In the attainment of the foregoing and other objects, an important feature of the present invention resides in providing an improved double-walled waste grease collection tank, and an improved method for heating the tank and dumping the waste grease by use of a collection truck of the type disclosed, for example, in the above mentioned U.S. Pat. No. 4,450,828 and U.S. Pat. No. 5,718,220, in which the collection tank is dipped into a container of hot water for melting or softening the grease at the tank surface to facilitate dumping. The disclosures of U.S. Pat. No. 4,450,828 and U.S. Pat. No. 5,718,220 are incorporated herein by reference.

The improved grease tank of the present invention comprises spaced inner and outer container portions each having a bottom wall and upwardly extending sidewalls which, container portions are rigidly joined and retained in spaced relation to provide a defined space therebetween. The inner and outer container portions are joined at the top by a continuous flange or top wall portion. The sidewalls of the inner container portions may incline slightly outwardly from the bottom wall to facilitate dumping.

In order to enable use of a double-walled collection tank of the invention with a waste grease collection truck in which the tank is partially submerged in hot water, the outer container wall of the tank is provided with one or more openings which may be closed with a removable plug or other closure element. In use of the tank for in situ collection of waste grease, a removable closure is mounted in the opening to provide a sealed outer container meeting the requirements of environmental protection regulations. When the tank is to be emptied, it is prepared for removal and emptying at the collection site by removing the removable closure plugs, whereupon it is then lifted into position above the hot water bath on the collection truck. The tank is then lowered into the hot water bath so that hot water flows through the apertures in the outer wall of the tank into the space between the double walls to heat the inner wall and thereby melt or soften adjacent solid or semi-solid grease. The tank is then lifted above the hot water bath and the water in the double-walled tank portion is permitted to drain from the openings before the waste grease is dumped in the conventional manner shown in U.S. Pat. No. 4,450,828 and U.S. Pat. No. 5,718,220. The tank is then returned to its previous position and the removable closures are then replaced to provide a sealed double-walled tank.

BRIEF DESCRIPTION OF THE DRAWINGS

Other features and advantages of the invention will be apparent from the detailed description contained herein below, taken in conjunction with the drawings, in which.

DESCRIPTION OF THE PREFERRED EMBODIMENTS

Figure 1:
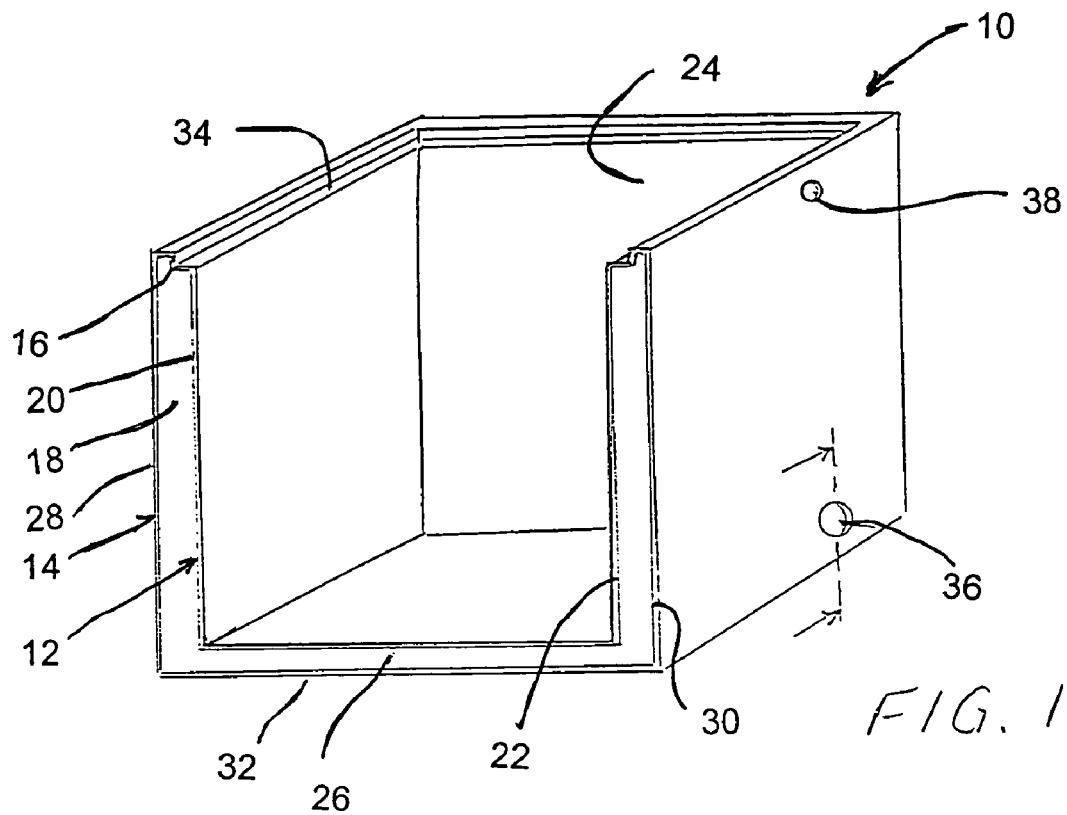
FIG. 1 is a sectional view, taken along line 1—1 in FIG. 3, in perspective, of a waste grease collection tank according to the invention.
Figure 3:
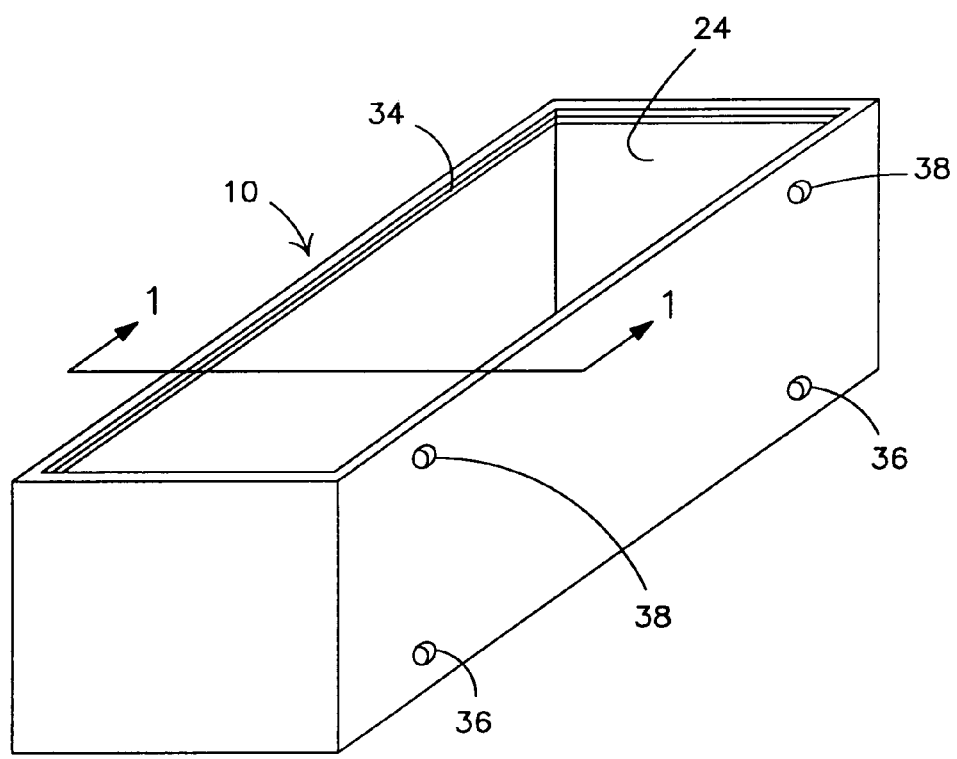
FIG. 3 is a perspective view of a waste grease collection tank according to the invention.
Figure 4:
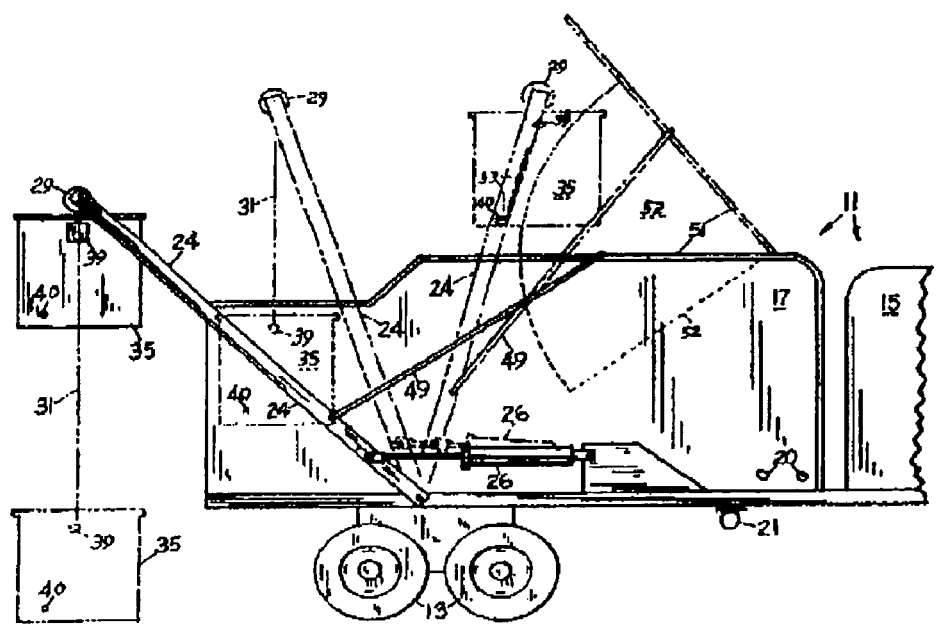
FIG. 4 is a perspective view of a prior art process and apparatus for collecting grease by a transport truck.

Referring now to the drawings, an improved waste grease collection tank according to the invention is designated generally by the reference numeral 10 in FIGS. 1 and 3 and includes an inner container portion 12 and an outer container portion 14, each of generally rectangular configuration adjoined at or near their opened tops by a continuous, stepped flange-like top wall 16 to retain the inner and outer containers 12 and 14, in spaced relation to one another to define an open space 18 therebetween. Preferably the inner and outer container portions 12 and 14, are each formed of substantially flat steel plates continuously welded, although the respective containers can be formed by other means such as by deep drawing.

The inner container portion 12, has opposed upwardly extending and preferably slightly outwardly inclined sidewalls 20, 22, end inner walls 24, only one of which is shown in FIG. 1, and a substantially flat bottom wall 26. Similarly, outer container 14 portion comprises upwardly extending sidewalls 28, 30, opposed end walls each spaced outwardly from the end walls 24, and a bottom wall 32. The stepped flange 16 provides a ledge 34 which serves as a seat for a suitable lid or cover (not shown) for the tank.

The outer container portion 14 is provided with a plurality of closable openings 36 formed in the side- and/or end walls thereof adjacent to its bottom wall and one or more vent openings 38 adjacent its top edge.

The openings 36 serve as fill openings to permit hot water to enter the space 18 when the collection tank is submersed in the hot water bath carried by a collection truck to fill the space 18 to the level of submergence of the tank. To facilitate this filling, air in the space 18 can escape through the vent openings 38.

Figure 2:
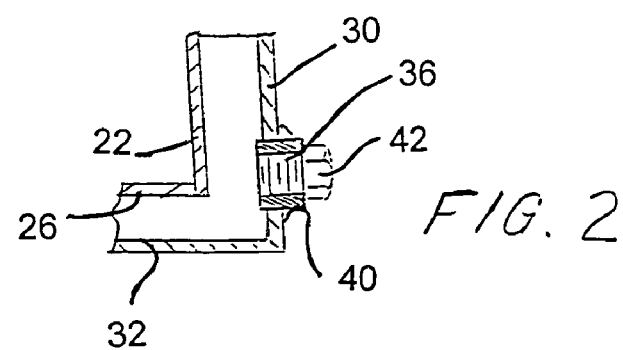
FIG. 2 is an enlarged sectional view, taken along line 2—2 in FIG. 1.

In use, in order to provide the double-walled environmental protection feature, the fill openings 36 are closed by removable closures or plugs until the tank is to be emptied. Thus, as shown in FIG. 2, the wall 30 may be provided with a threaded weldment 40 which will normally be closed by a removable threaded plug 42. Alternatively, the fill holes 36 may be sealed by a quick release expanding plug (not shown) suitable to maintain the fluid tight integrity of the outer container portion 14. Also, vent openings 38 may, if desired, be closed by removable closure members, for example, as shown in FIG. 2.

The improved collection tank according to the invention is disposed normally at the place of use to collect waste grease. During this time, the fill openings 36 are sealed by the closure members 42, and if desired, the vents 38 may also be closed. When the full tank is to be emptied, the grease collection tank is moved into the collection position and the fill plugs 42 are removed. At the same time, if vent closures are used, those closures are also removed. The filled tank is then lifted and lowered into the hot water bath carried by the collection truck so that the hot water flows through the openings 36 to fill the space 18 to the level of submersion. The hot water in contact with the walls of the inner container portion 12 quickly melts or softens the portion of the solid or semi-solid grease in the container adjacent the walls. The tank is then lifted and held above the hot water bath for a sufficient time for the water to drain from the fill openings 36. The container is then moved into a position over the waste grease transport tank on the collection truck, and dumped in the conventional manner. The tank is then lowered and returned to the in situ collection site, whereupon the drain plugs 42 and vent plugs are replaced. Thus, one can see that providing direct contact of the hot water bath with the inner wall of the double-walled waste grease collection tank speeds the collection tank emptying process.

While a preferred embodiment of the invention has been disclosed and described, it is to be understood that the invention is not restricted solely thereto but rather that various modifications may be made without departing from the spirit and scope of the invention.

I claim:

1. An improved double-walled grease collection tank for use in a waste grease collection system including a truck-mounted grease transport tank, lift means for handling and dumping individual on-site grease collection tanks into the truck grease transport tank, and an intermediate stage heating bath into which the double-walled grease collection tank is deposited temporarily to liquify grease in contact with the inner surfaces of the collection tank in order to facilitate dumping the contents thereof, the improvement wherein said double-walled grease collection tank comprises an inner container portion defined by an inner bottom wall and integrally joined upwardly extending inner sidewalls, an outer container portion defined by an outer bottom wall and integrally joined upwardly extending outer sidewalls, the inner container portion being received in the outer container portion with the bottom walls and sidewalls of the inner and outer container portions being disposed in opposed spaced relation to define an open space therebetween, flange means rigidly joining said inner and outer container portions at or near a top portion of their respective sidewalls, at least one fill opening formed in at least one of said sidewalls of said outer container portion adjacent its bottom wall, at least one vent opening in said double-walled collection container near its top portion, and fill opening closure means removably mounted in each said at least one fill opening for closing and sealing the fill opening.

2. The collection tank defined in claim 1, comprising a plurality of fill openings formed in said sidewalls of said outer container portion.

3. The collection tank defined in claim 2, wherein said at least one vent opening in said double-walled collection container is formed in said outer container portion.

4. The collection tank defined in claim 3, wherein said at least one vent opening comprises a plurality of vent openings formed in the sidewalls of said outer container portion, and removable vent opening closures mounted in each said vent openings.

5. The collection tank defined in claim 1, wherein said inner and outer container portions are each generally rectangular in horizontal cross section.

6. The collection tank defined in claim 1, wherein said at least one fill opening comprises a threaded opening extending through at least one of said sidewalls of said outer container portions, and wherein said fill opening closure means comprises a threaded plug adapted to be threaded into and close each said at least one fill opening.

7. The collection tank defined in claim 5, wherein said at least one fill opening comprises a threaded opening extending through at least one of said sidewalls of said outer container portions, and wherein said fill opening closure means comprises a threaded plug adapted to be threaded into each said at least one fill opening to close same.

8. The collection tank defined in claim 1, wherein said flange means defines a stepped seat for a removable closure or lid.

9. In a process for collecting waste grease in which the grease is initially collected in a waste grease collection tank at a point of use and then transferred to a transport tank on a collection truck by lifting and submersing the collection tank in a hot water bath to melt the grease in the collection tank wall before emptying the grease into the transport tank, then returns the collection tank to the point of use, the improvement comprising providing said waste grease collection tank with inner and outer container portions each defined by a bottom wall and upwardly extending sidewalls and with the inner container portion received within and having its walls spaced from the outer container portion to defined a closed air space therebetween, providing at least one fill opening in at least one of said sidewalls of the outer container portion adjacent its bottom wall, and sealingly closing each said fill opening with a removable closure member, removing the closure members from the fill openings when the filled collection tank is to be emptied, lifting the filled collecting tank and submersing it into the hot water bath and permitting the hot water to flow through the fill openings to fill the air space between the inner and outer container space to the level of submersion of the collecting tank, retaining the collecting tank in the hot water bath for a time sufficient to melt the grease adjacent the inner container portion walls, lifting the collection tank from the hot water bath and draining the hot water from the air space through the fill openings, emptying the collection tank into the transport tank, and replacing the closure members in the fill openings and returning the empty collection tank to the place of use.

10. The process for collecting waste grease defined by claim 9, further comprising providing at least one vent opening in the sidewalls of the outer container portions to facility filling of the air space between the inner and outer container portions with hot water and draining the hot water from the air space.

11. The process for collecting waste grease defined in claim 10, further comprising providing each at least one vent opening with a removable vent closure, removing the closures from the vent openings prior to submersing the collection tank in the hot water bath, and replacing the closure members in the vent opening after the collection tank is emptied.

* * * * *